May 28, 1957 L. B. HUNT, JR 2,793,785
CLOSURE FOR FUEL TANKS
Filed Jan. 20, 1954 2 Sheets-Sheet 1

INVENTOR
Letcher B. Hunt Jr.
BY
ATTORNEY

United States Patent Office 2,793,785
Patented May 28, 1957

2,793,785

CLOSURE FOR FUEL TANKS

Letcher B. Hunt, Jr., Detroit, Mich., assignor to General Motors Corporation, Detroit, Mich., a corporation of Delaware Application January 20, 1954, Serial No. 405,121

5 Claims. (Cl. 220—30.5)

This invention relates to closures and more particularly to closures for the filler tubes of fuel tanks as employed on automotive vehicles.

A closure for a fuel filler tube should be of adequate size and free of restricting protuberances when open for the introduction of fuel into the tube and tank. It also should be convenient in use and should be permanently attached to the vehicle so as not to become lost. The mechanical design of the closure should be such as to lend itself to modern automotive vehicle contours in the interest of aesthetic body appearance and yet meet the aforementioned requirements.

To these ends, an object of the present invention is to provide an improved closure for fuel tanks which, subsequent to a rotative motion imparted to it, automatically opens a fuel filler tube on such tanks.

Another object is to provide a closure which automatically opens when a cover thereon is rotated and which subsequently and automatically resets itself for retaining its closed position upon being closed.

A feature of the invention is a closure arrangement in which rotation of a cover on its own axis releases a valve from its position closing a filler tube and which includes means for automatically moving the valve and cover from their closed positions upon such release.

Another feature is a closure having a cover which is rotatable in one direction and on its own axis to release a valve from a holding means and which is automatically rotatable in the other direction to reset the closure preparatory to subsequent closing.

These and other important features of the invention will now be described in detail in the specification and then pointed out more particularly in the appended claims.

Figures 1, 2:
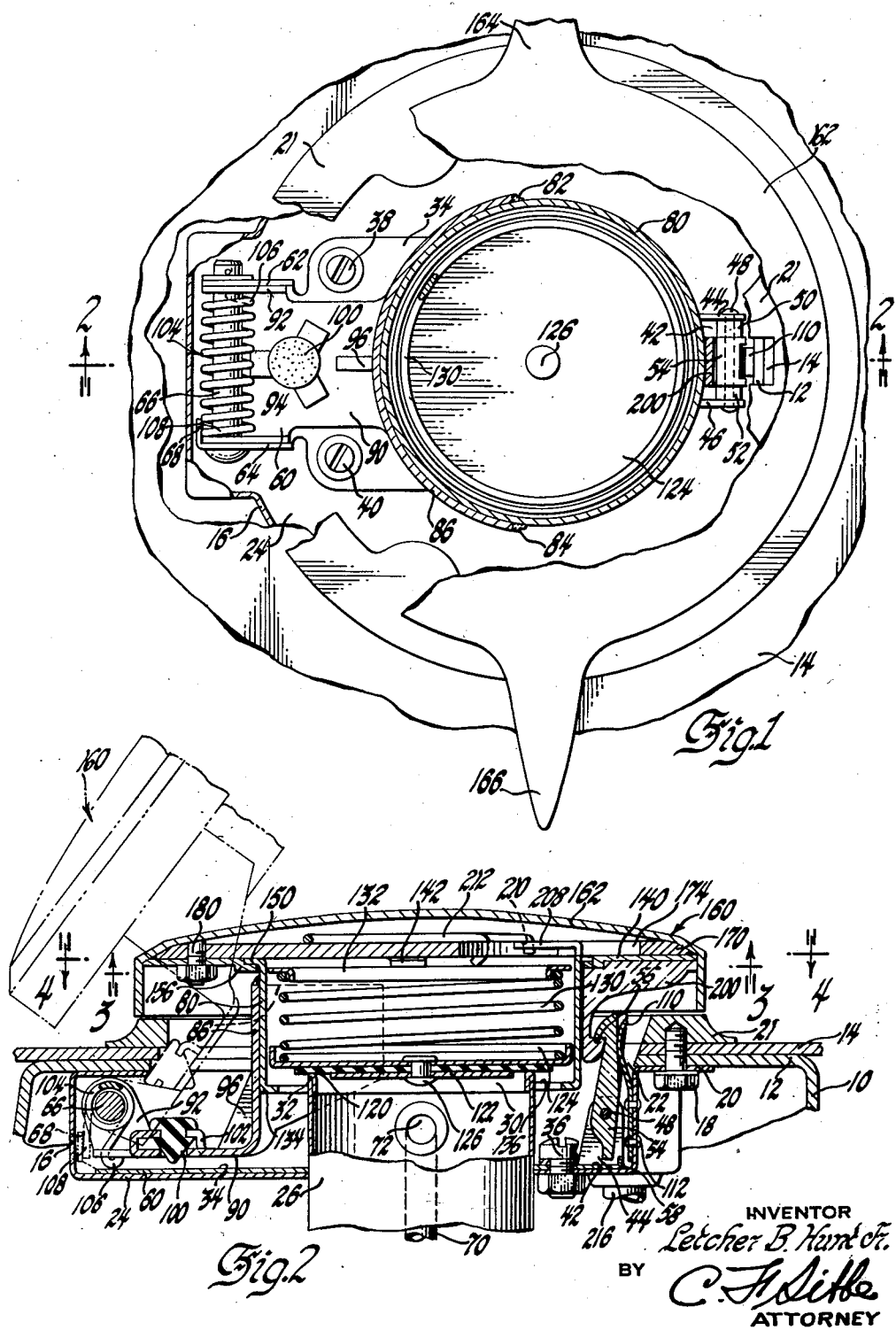
Fig. 1 is a plan view of a closure embodying the present invention shown installed on an automobile body, parts being broken away for clarity of illustration.
Fig. 2 is a sectional view of the closure taken along the line 2—2 in Fig. 1 showing the closure in closed position in full lines and in open position in broken lines.

In the drawings a support or rear deck inner panel 10 of a vehicle is shown having a top wall 12 which engages a portion of a vehicle body 14. Within the panel 10 is mounted a cup-shaped member 16 held in place by means of three annularly spaced studs (only one being shown in the drawings). Each of the studs 18 extends through aligned openings provided in flanges 20 of the cup member 16, the wall 12, body 14 and an annular escutcheon ring 21. An opening 22 is formed in the wall 12 of the panel and is arranged in registry with openings formed in the body 14 and the ring 20, these openings leading to the interior of the cup member 16. The base 24 of the cup member 16 surrounds a filler tube 26 and is provided with an opening which snugly receives the filler tube. The filler tube 26 is arranged as a means for charging fuel into a tank located beneath the panel 10 and one end thereof extends upwardly into the cup 16 and its annular lip is doubled over as shown at 30 to form a circular valve seat 32. The fuel tank is not shown in the drawings.

A base plate 34 is attached to the bottom of the cup 16 by means of three bolts 36, 38 and 40 and it is apertured to encompass the tube 26. Base plate 34 is provided with an extension 42 having two upstanding and parallel flanges 44 and 46. A pin 48 is supported by these two flanges and two spacing washers 50 and 52 serve to center a latch member 54 midway the length of the pin. The latch member 54 is pivoted on the pin, a portion thereof extending upwardly and having a downwardly facing shoulder 56 thereon. The extreme end of the extension 42 is flanged at 58 to provide a stop for the member 54.

Another extension 60 disposed at the other end of the base plate 34 is provided with upstanding and parallel flanges 62 and 64 for supporting a pivot pin 66. The flange 64 is substantially L-shaped as viewed in Fig. 1 as it provides a stop portion 68.

An air vent pipe 70 for the fuel tank is provided and is arranged to extend upwardly along one side of the tube 26 and then at a right angle into the cup 16 and to communicate through an opening 72 with the interior of the tube.

A sleeve member 80, when the closure is closed as viewed in Fig. 2, is substantially coaxial with the tube 26. This sleeve member is attached as by welding at 82 and 84 to an arcuate member 86 having a horizontal extension 90. The extension 90 is provided with two upstanding and parallel ears 92 and 94 which are journaled on the pin 66 adjacent to the flanges 62 and 64, respectively. A stiffening web 96 is made integral with the arcuate member 86 and the horizontal extension 90.

A resilient neoprene buffer member 100 is held in position on the horizontal extension 90 by three fingers 102. A coil spring 104 is mounted on the pin 66 with one end 106 extending downwardly through the horizontal extension 90 and engaging the bottom side thereof. The other end 108 of the spring is arranged to contact the stop portion 68.

A spring member 110 is riveted as at 112 to the cup member 16 and resiliently engages the latch member 54 to urge the shoulder 56 of the latter towards the sleeve member 80.

A neoprene disc 120 is arranged to engage the rounded valve seat 32 and is confined between a metal disc 122 and a flanged disc 124. The disc 122 is smaller than the interior diameter of the tube 26 and is held in assembled relation with the neoprene disc 120 and the flanged disc 124 by means of a central rivet 126. A coil spring 130 is confined between the flanged disc 124 and a spring seat 132. The bottom end of the sleeve 80 is provided with an inwardly extending flange 134 to present an upwardly facing shoulder 136. This shoulder extends beneath the margins of the flanged disc 124 but is formed with ample clearance around the tube 26.

An annular disc 140 is arranged to surround the upper end of the sleeve 80 which is provided with three spaced tongues 142, 144 and 146 extending inwardly over the outer margin of the spring seat 132. The upper edge of the sleeve 80 also bears three spaced and outwardly extending flanges 150, 152 and 154 which extend into an annular depressed portion 156 of disc 140.

Figure 3:
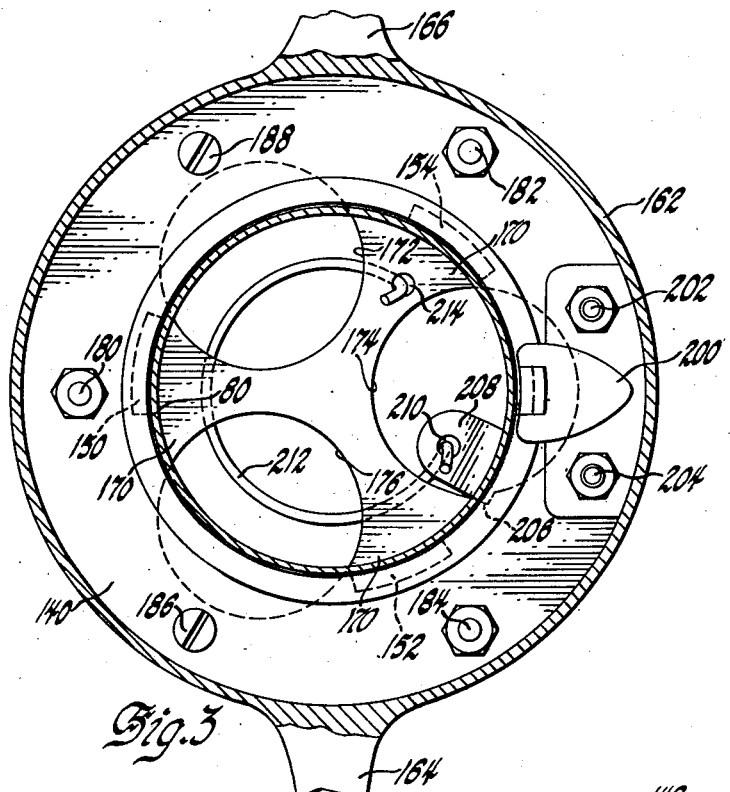
Fig. 3 is a sectional view taken along line 3—3 of Fig. 2.
Figure 4:
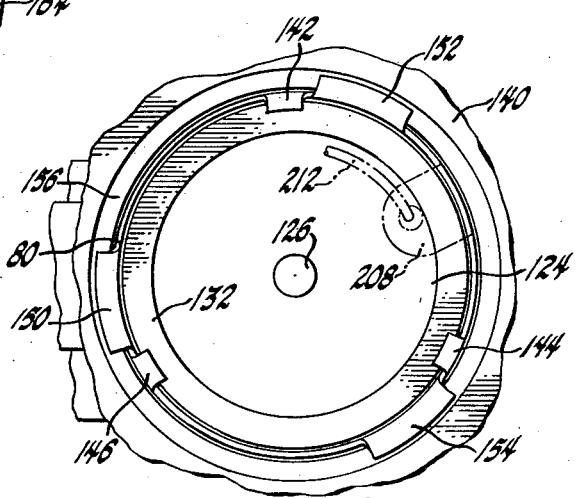
Fig. 4 is a plan view of certain details of the structure shown in Fig. 3, said view being taken substantially along line 4—4 of Fig. 2.

A cover generally indicated at 160 comprises an inverted and ornamental cap 162 having two diagonally opposed arms 164, 166 and also strengthening disc 170 which imparts rigidity to the cap. The disc bears three relatively large apertures 172, 174 and 176 which serve to reduce the weight of the cap or cover. The disc 170 is attached to the cap 162 by means of three studs 180, 182 and 184 and nuts threaded thereon. These studs are conveniently made integral with the cap 162. Two machine screws 186 and 188 are also used in the positions shown in Fig. 3 to attach the disc 140 to the disc 170.

A striker member 200 is positioned to cooperate with the latch member 54 to form a means for holding the cover and valve in their closed positions. This member is attached to the underside of the disc 140 by means of two studs 202 and 204.

The disc 170 is notched as at 206 to provide a stop for the vertical portion of an L-shaped flange 208 which is integral with the sleeve 80 and extends into the opening 174. The flange 208 is perforated as at 210 to receive one hooked end of an arcuate spring member 212. The other end of the spring member extends through an opening 214 in the disc 170.

A drain pipe 216 communicates with the bottom of the cup member 16 for the purpose of draining any fuel spilled into the cup, moisture or dust and causing the drainage to fall upon the ground.

From the above description of the construction, the operation of the device is believed to be clear. However, it may be stated that if the cover 160, while positioned as shown in full lines in Fig. 2, is rotated against resistance of the spring 212, the shoulder of the disc 170 in the recess 206 will leave the flange 208 and the shoulder on the striker 200 will be displaced from beneath the shoulder 56 of the latch member 54. Tension in the coil spring 104 will then cause the sleeve 80 together with the cover 160 and the neoprene sealing disc 120 to move upwardly about the pin 66 as a center. Upon manual release of the cover 160 the spring 212 will reverse the direction of the previous rotation and position the striker 200 so that when the cover is subsequently slammed shut the latch mechanism will again come into operation and hold the neoprene disc 120 in yielding engagement with the end of the tube 26 to sealingly close the latter.

When the closure is thrown open the annular shoulder 136 in the sleeve 80 retains the spring 130 as well as the valve parts in their assembled relation with respect to the cover. The buffer member 100 is so placed as to strike the edge of the panel surrounding the opening 22 and cushions the shock which otherwise would be encountered.

Latching pressure normal to the surface of the shoulder 56 is provided by the compressive force of the spring 130, and the recess 206 determines the radial locked position of the closure.

I claim:

1. A closure for a fuel tank filler tube located contiguous to an opening larger than said tube formed in the wall of a support, said closure comprising a cup member with its bottom adapted to surround and snugly engage the outside of said tube and having a flanged wall adapted to be attached to said support, a sleeve member pivotally mounted on pivot means having an axis at one side of said cup, a cover rotatably mounted on said sleeve, holding means connecting said cover and cup and releasable upon rotation of the said cover with respect to the sleeve, a valve retained within said sleeve and adapted resiliently to close the end of said tube, and a spring connecting said sleeve and cover to resist said rotation and adapted to urge said cover to a predetermined position relative to said sleeve and holding means.

2. A closure for a fuel tank filler tube located contiguous to an opening formed in the wall of a support, said closure comprising a cup member adapted to engage and surround said tube and extending outwardly for attachment to said support, a sleeve member mounted on pivot means located at one side of said cup, a cover rotatively mounted on said sleeve, holding means spaced from said pivot means and connecting said cover and cup and releasable upon rotation of the said cover with respect to said sleeve, a valve retained within said sleeve and adapted to close the end of said tube, a spring arranged to open said valve by pivoting said sleeve member about said pivot means upon rotation of said cover, and a spring connecting said sleeve member and cover and resisting said cover rotation.

3. A closure for a fuel tank filler tube located contiguous to an opening larger than said tube formed in the wall of a support, said closure comprising a cup with its bottom adapted to surround and engage said tube and having a wall to be attached to said support, a sleeve member mounted on pivot means within said cup and at one side of said cup, a cover rotatively mounted on said sleeve, said cover being larger than said opening to conceal the same, holding means connecting said cover and cup and releasable upon rotation of the said cover with respect to said sleeve, a resiliently mounted valve retained within said sleeve and adapted to close the end of said tube, and a spring connecting said sleeve and cover and resisting said cover rotation.

4. A closure comprising a support and a fuel tank filler tube accessible by way of an opening formed in the wall of said support, an escutcheon ring attached to the outside of said support and surrounding said opening, a cup member surrounding and engaging the outside of said tube and attached to said support, a sleeve member mounted on pivot means located at one side of said tube and within said cup member, a cover mounted on said sleeve and being rotatable relative to the latter, said cover being arranged to overlap said escutcheon ring to cover said opening, holding means connecting said cover and cup and releasable upon rotation of the said cover with respect to the said sleeve in a plane substantially parallel with said escutcheon plate, a valve retained within said sleeve and adapted resiliently to close the end of said tube, and a spring connecting said sleeve and cover and resisting said cover rotation on said sleeve.

5. A closure for a fuel tank filler tube accessible by way of an opening in the wall of a support such as a tank, said closure comprising a cup member with an opening in its bottom adapted snugly to receive said tube, said member extending outwardly for joinder to said wall, a sleeve member extending into said cup, pivot means including a pivot pin at one side of said cup connecting the said sleeve member thereto for movement of the latter out of said cup, a cover overlying said sleeve member and rotatable thereon in a plane parallel with said pin, a latch striker affixed to said cover to rotate therewith and spaced from said pivot means, a latch associated with said cup member to cooperate with said striker, and a spring loaded valve mounted within said sleeve and arranged resiliently to face the said bottom whereby it may seal the end of said tube when said latch striker and latch are engaged.

References Cited in the file of this patent

UNITED STATES PATENTS

| | | |
|---|---|---|
| 1,909,554 | Stant | May 16, 1933 |
| 2,663,447 | Westcott | Dec. 26, 1948 |
| 2,505,637 | Chase | Apr. 25, 1950 |
| 2,582,109 | De Fee | Jan. 8, 1952 |
| 2,682,968 | Crowe | July 6, 1954 |

FOREIGN PATENTS

| | | |
|---|---|---|
| 474,853 | Great Britain | Nov. 9, 1937 |
| 152,712 | Australia | Aug. 5, 1953 |